US009282105B1

(12) United States Patent
Tomasso

(10) Patent No.: US 9,282,105 B1
(45) Date of Patent: *Mar. 8, 2016

(54) WIDE AREA NETWORK ACCESS MANAGEMENT COMPUTER

(71) Applicant: KCT HOLDINGS, LLC, Turnersville, NJ (US)

(72) Inventor: Keiron Christopher Tomasso, Sewell, NJ (US)

(73) Assignee: KCT HOLDINGS, LLC, Turnersville, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/480,265

(22) Filed: Sep. 8, 2014

Related U.S. Application Data

(63) Continuation of application No. 12/956,401, filed on Nov. 30, 2010, now Pat. No. 8,832,425.

(60) Provisional application No. 61/265,464, filed on Dec. 1, 2009.

(51) Int. Cl.
*G06F 21/00* (2013.01)
*H04L 29/06* (2006.01)

(52) U.S. Cl.
CPC .......... *H04L 63/105* (2013.01); *H04L 63/0272* (2013.01)

(58) Field of Classification Search
CPC .... H04L 63/105; H04L 63/30; H04L 63/0272
See application file for complete search history.

(56) References Cited

U.S. PATENT DOCUMENTS

| 7,623,458 B2 * | 11/2009 | Ayyagari et al. ............. 370/235 |
| 8,219,799 B1 * | 7/2012 | Lucchesi et al. ............. 713/153 |
| 2007/0005780 A1 | 1/2007 | Hanson |
| 2009/0019527 A1 * | 1/2009 | Winslow ........................ 726/4 |
| 2010/0017599 A1 * | 1/2010 | Sellars et al. ................ 713/156 |
| 2010/0254395 A1 | 10/2010 | Smith et al. |
| 2011/0103393 A1 | 5/2011 | Meier et al. |

OTHER PUBLICATIONS

Criste, "Implementing the Global Information Grid" May 18, 2004, pp. 1-24.
Nakamoto, "Scalable HAIPE Discovery" 2006 in Visualizing Network Information pp. 1-14.
Information Assurance Specialists, "Executive Computing Kit" retrieved Dec. 11, 2012 from www.iaspecialists.com/docs/IAS_ECK-Datasheet.pdf pp. 1-2.
Taclane Multibook Secure Laptop, retrieved Dec. 11, 2012 from http://www.gdc4s.com/Documents/Products/Computing/TACLANE-MultiBook/GD-TACLANE-MultiBook.pdf, pp. 1-2.

* cited by examiner

*Primary Examiner* — Lisa Lewis
(74) *Attorney, Agent, or Firm* — Volpe and Koenig, P.C.

(57) ABSTRACT

A system and method for connecting a classified internet protocol (IP) network to a public IP network including an unclassified computing device. The unclassified computing device is a wide area network access management computer which directly connects to a National Security Agency (NSA) High Assurance Internet Protocol Encryptor (HAIPE) device and interfaces between the IP network and the classified IP network. The wide area network access management computer includes a graphical user interface, an internal data network communications interface, an external data network communications interface and a processing unit. The processing unit operates the network interfaces and presents information to the graphical user interface and interprets user input from the graphical user interface. The processing unit also performs the processing and protocols associated with the internal and external networks, performs client processing and allows the user to interact with services on any of the attached networks.

17 Claims, 2 Drawing Sheets

(HAIPE to WAMP using
internal interface)

(HAIPE to WAMP using
external interface)

WIDE AREA NETWORK ACCESS MANAGEMENT COMPUTER

CROSS REFERENCE TO RELATED APPLICATION

This application is a continuation of U.S. patent application Ser. No. 12/956,401, filed Nov. 30, 2010, which will issue on Sep. 9, 2014 as U.S. Pat. No. 8,832,245, which claims the benefit of U.S. provisional application No. 61/265,464 filed Dec. 1, 2009, which are incorporated by reference as if fully set forth.

FIELD OF INVENTION

This invention relates to the field of secure network connection devices.

BACKGROUND

The government and military widely use internet protocol (IP) based communications, including use in dynamic operational environments. Dynamic operational environments can take place in hotel rooms, residences, forward operating bases, and/or other impromptu temporary locations. Dynamic operating environments are considered to be any location where an individual, or individuals, desires to connect to a government or military network over an IP based communications connection.

These highly agile IP based communications sessions may include the required use of a National Security Agency (NSA) accredited encryptor to protect sensitive or classified information and a classified computer, or computers, to view, edit, or generate sensitive or classified data. These classified computers are protected from exposing sensitive or classified information to the public IP network through the use of a NSA accredited High Assurance Internet Protocol Encryptor (HAIPE) device.

In these dynamic operational environments an individual may need to acquire, purchase, or authorize access to the IP network. Further, they may need to configure, establish, authenticate, or manage the way in which the NSA HAIPE device connects, or interfaces, to the IP network, which may be the Internet or any other Wide Area Network. However, it is against government and military security policy to connect a computer that holds, or may hold, sensitive or classified information to an IP network for the purpose of acquiring, purchasing access to, authorizing us of, configuring, establishing a connection with, authenticating, or managing the connection or availability of an IP network in an effort to prevent potential inadvertent disclosure of sensitive or classified information.

SUMMARY

An unclassified computer, a wide area network access management computer 102 here, enables a classified computer 100, or computers, secured by a NSA HAIPE device 101, or devices, to communicate classified communications over IP networks 105. A communication system may include a classified computer terminal 100, such as a laptop device or portable computing device, for example, a netbook, ultra mobile personal computer, voice over IP (VoIP) telephony device, and a NSA HAIPE cryptographic device 101.

The wide area network access management computer 102 enables IP connectivity for the classified computing device 100, or devices through enabling IP connectivity for the NSA HAIPE device 101, or devices. The wide area network access management computer 102 may be connected directly to a NSA HAIPE device 101 on its internal network interface, and a public IP network 105 on its external network interface. The wide area network access management computer 102 may be included in a system of subsystems 103, where that system of subsystems 103 may include a NSA HAIPE device 101 and a wide area network access management computer 102.

The wide area network access management computer 102 may be configured to interface between the NSA HAIPE device 101, or devices and the internet protocol (IP) network 105 such that a secure channel is established between the classified computing device 100, or devices, protected by the NSA HAIPE device 101 attached on the internal network interface and a classified computer network which they seek to view, edit, or generate sensitive or classified data on or across reach through its external network interface.

The wide area network access management computer 102 may include a graphical user interface, internal network interfaces (such as an Ethernet interface, for example), external network interfaces (such as an Ethernet, 802.11 Wi-Fi, 802.16 Wi-Max, BlueTooth, 2G/3G/4G Cellular, or satellite interface 104, for example), and a processing unit with an operating system (such as Microsoft Windows, Linux, OS X, for example). The processing unit performs the operations necessary to operate the internal network interfaces and external network interfaces, as well as present information to the graphical user interface and interpret user input from the graphical user interface. The processing unit leverages an operating system and associated applications to perform the processing and protocols associated with interconnecting the internal and external network interfaces including, but not limited to, routing protocols, proxy services, and encapsulation protocols. The processing unit also performs network client processing such as web browsing, video teleconference (VTC), VoIP telecommunications, chat, email and other processing to allow the user to interact with services provided on any of the attached networks.

DETAILED DESCRIPTION

Figure 1:
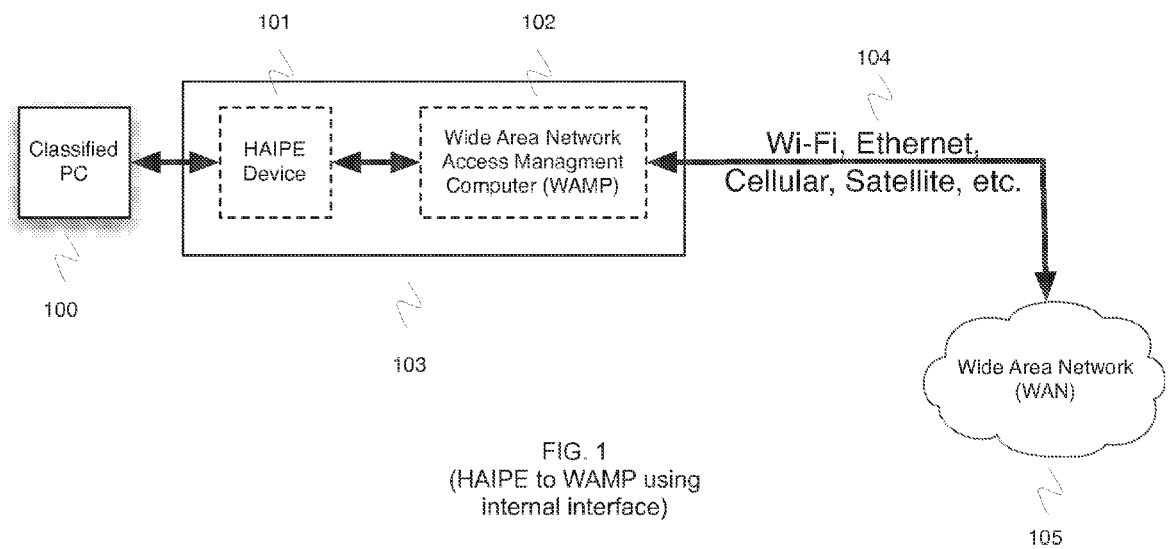
FIG. 1 is a block diagram of an example implementation of the wide area network access management computer implemented using internal interfaces.

An individual that needs to access sensitive or classified government or military networks must do so using a NSA HAIPE network encryptor 101 and a computing device 100 of some sort. The wide area network access management computer 102 may allow the NSA HAIPE device 101, and subsequent computing device 100, or devices, to gain access to IP data networks over various IP network connectivity options, using various IP networking protocols. The wide area network access management computer 102 acts as a go between for the NSA HAIPE 101 and the public IP network 105. The wide area network access management computer 102 is configured to interface between an IP network 105 and the classified IP network.

An individual may wish to use a hotel Ethernet connection to gain access to the Internet in order to connect back to a sensitive or classified network. However, most hotels require that the individual who wishes to use the hotel provided internet service to pay a small one time or recurring fee for service. This fee payment, and connectivity, takes place using a graphical user interface and an Internet browser software program running on this graphical user interface. The wide area network access management computer 102 may allow the individual to access an internet browser software program to allow for subscription to the hotel internet service, without having to connect the individual's classified computing device 100 to the public internet (which is against government and military security policy).

Additionally, the wide area network access management computer 102 may allow an individual, or individuals, to connect to many types of data network connections that allow for IP network connectivity. These connections include but are not limited to, Ethernet, 802.11 Wi-Fi, 802.16 Wi-Max, BlueTooth, 2G/3G/4G Cellular, or satellite interfaces 104. Also, the wide area network access management computer 102 allows individuals to take advantage of various software-based performance enhancing protocols, applications, or other network or computing tools.

FIG. 1 shows a block diagram of an example implementation of the wide area network access management computer 102. The classified computing device 100 is connected to the NSA HAIPE device 101 and the NSA HAIPE device 101 is connected to the wide area network access management computer 102 on its internal network interface. The wide area network access management computer 102 is connected to the wide area network (WAN) 105 on its external network interface. Together, the NSA HAIPE device 101 and the wide area network access management computer 102 form a subsystem 103.

The wide area network access management computer 102 may include a graphical user interface to allow the user to access information and input commands. The wide area network access management computer 102 also includes an internal data network communications interface and an external data network communications interface. The internal data network communications interface allows for the connection of the wide area network access management computer 102 and the NSA HAIPE device 101. This connection may be established by an Ethernet interface. The external data network communications interface allows for the wide area network access management computer 102 to connect to the public IP network 105. The external data network communications interface may be connected to the public IP network 105 through a connection such as Ethernet, 802.11 Wi-Fi, 802.16 Wi-Max, BlueTooth, 2G/3G/4G Cellular, or satellite interface 104.

The wide area network access management computer 102 may also include a processing unit which runs on an operating system. The processing unit operates the connections between the internal and external data network communication interfaces. The processing unit also enables the wide area network access management computer 102 to display information on the graphical user interface. The processing unit interprets the user input from the graphical user interface and processes the connections necessary for the internal and external data network communication interfaces. The processing unit allows the user to access services provided on any attached networks. The processing unit also performs client processing, including web browsing, video teleconferencing, VoIP telecommunications, chat, email and other services.

Figure 2:
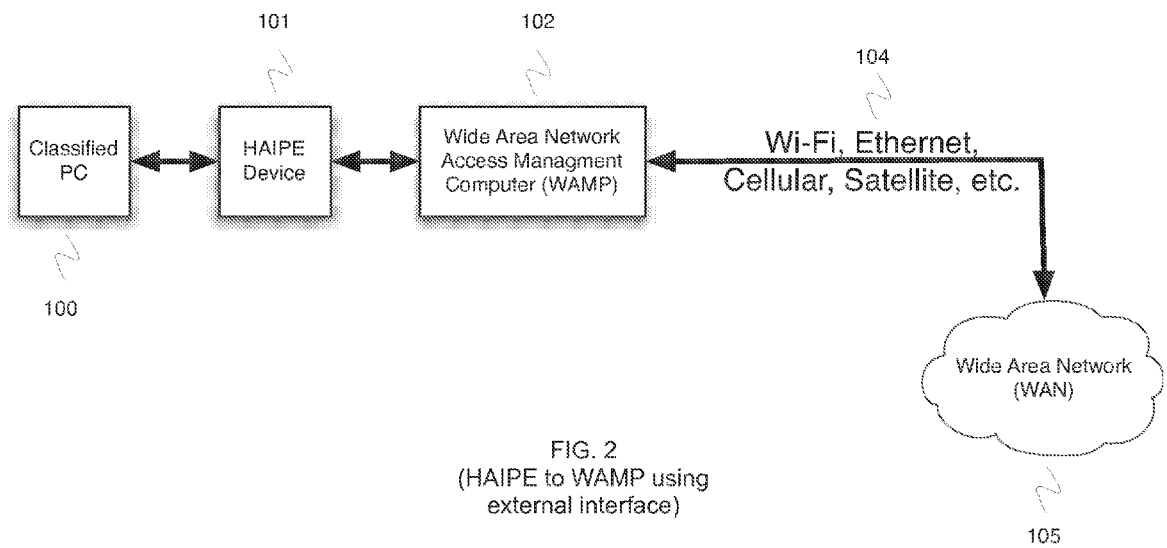
FIG. 2 is a block diagram of an example implementation of the wide area network access management computer implemented using external interfaces.

FIG. 2 shows a block diagram of an example implementation of a wide area network access management computer using external interfaces. The classified computing device 100 is connected to the NSA HAIPE device 101 and the NSA HAIPE device 101 is connected to the wide area network access management computer 102 on its external network interface. The wide area network access management computer 102 is connected to the wide area network (WAN) 105 on its external network interface. Together, the NSA HAIPE device 101 and the wide area network access management computer 102 are configured to provide individual to access an internet browser software program to allow for subscription to a hotel internet service, without having to connect the individual's classified computing device 100 to the public internet (which is against government and military security policy).

Features and elements are described above in particular combinations, each feature or element can be used alone without the other features and elements or in various combinations with or without other features and elements.

What is claimed is:

1. A network access management device for secure communications comprising:
   an internal data network communications interface configured to communicate with a classified computing device using a National Security Agency (NSA) High Assurance Internet Protocol Encryptor (HAIPE);
   an external data network communications interface configured to communicate with an unclassified network;
   a processor configured to perform processing and protocols associated with interconnecting the internal data network communications interface and the external data network communications interface, and associated with subscribing the network access management device to the unclassified network;
   wherein data can be communicated between the classified computer and the unclassified network via the network access management device on a condition that the device has been subscribed to the unclassified network.

2. The network access management device of claim 1, wherein subscribing the network access management device to the unclassified network comprises configuring the external data network communications interface for paid services on the unclassified network using an internet browser via a user interface.

3. The network access management device of claim 1, wherein configuring the external data network interface includes using an internet browser on an unclassified communications device's graphical user interface to allow for subscription to paid network services.

4. The network access management device of claim 1, wherein the internal data network communications interface is configured to connect the network access management computer and the NSA HAIPE.

5. The network access management device of claim 1, wherein the internal data network communications device is configured to connect the network access management computer and the classified computing device via the NSA HAIPE.

6. The network access management device of claim 1, further comprising: a user interface configured to facilitate classified network communications of at least one of the group consisting of web browsing, video teleconferencing (VTC), voice over IP (VoIP) telecommunications, chat, and e-mail.

7. The network access management device of claim 1 wherein the external data network communications interface is an 802.11 wifi interface.

8. The network access management device of claim 1 wherein the external data network communications interface is a cellular interface.

9. The network access management device of claim 1 wherein the external data network communications interface is a satellite interface.

10. The network access management device of claim 1 wherein the processor includes a Linux operating system.

11. The network access management device of claim 1 wherein the processor includes a Microsoft Windows operating system.

12. A method for secure communications using a network access management device which comprises an internal data network communications interface configured to communicate with a classified computing device using a National Security Agency (NSA) High Assurance Internet Protocol Encryptor (HAIPE), an external data network communications interface configured to communicate with an unclassified network, and a processor configured to perform processing and protocols associated with interconnecting the internal data network communications interface and the external data network communications interface, and associated with subscribing the network access management device to the unclassified network; the method comprising:
permitting communications between the classified computer and the unclassified network via the network access management device on a condition that the device has been subscribed to the unclassified network using the user interface.

13. The method of claim 12, wherein subscribing the network access management device to the unclassified network comprises configuring the external data network communications interface for paid services on the unclassified network using an internet browser.

14. The method of claim 12, wherein configuring the external data network interface includes using an internet browser on an unclassified communications device's graphical user interface to allow for subscription to paid network services.

15. The method of claim 12, wherein the internal data network communications interface is configured to connect the network access management computer and the NSA HAIPE.

16. The method of claim 12, wherein the internal data network communications device is configured to connect the network access management computer and the classified computing device via the NSA HAIPE.

17. The method of claim 12, further comprising facilitating classified network communications of at least one of the group consisting of web browsing, video teleconferencing (VTC), voice over IP (VoIP) telecommunications, chat, and e-mail.

* * * * *